(12) United States Patent
Jones et al.

(10) Patent No.: US 10,552,195 B2
(45) Date of Patent: Feb. 4, 2020

(54) MIGRATION OF VIRTUAL INFRASTRUCTURES

(71) Applicant: VMware, Inc., Palo Alto, CA (US)

(72) Inventors: Steve Jones, Melrose, MA (US); Praagyan Pokharel, Austin, TX (US); Shivam Tiwari, Jersey City, NJ (US); Jeff Moroski, South Abington, PA (US)

(73) Assignee: VMware, Inc., Palo Alto, CA (US)

( * ) Notice: Subject to any disclaimer, the term of this patent is extended or adjusted under 35 U.S.C. 154(b) by 153 days.

(21) Appl. No.: 15/836,602

(22) Filed: Dec. 8, 2017

(65) Prior Publication Data

US 2019/0179658 A1    Jun. 13, 2019

(51) Int. Cl.
*G06F 9/455* (2018.01)
*G06F 16/21* (2019.01)
*H04L 29/08* (2006.01)

(52) U.S. Cl.
CPC ........ *G06F 9/45558* (2013.01); *G06F 16/214* (2019.01); *G06F 2009/4557* (2013.01); *G06F 2009/45595* (2013.01); *H04L 67/1097* (2013.01)

(58) Field of Classification Search
None
See application file for complete search history.

(56) References Cited

U.S. PATENT DOCUMENTS

| 2011/0119748 | A1* | 5/2011 | Edwards | G06F 9/5077 726/12 |
| 2016/0241513 | A1* | 8/2016 | Sridharan | G06F 9/45558 |
| 2017/0149687 | A1* | 5/2017 | Udupi | H04L 67/1002 |
| 2018/0139272 | A1* | 5/2018 | Puri | G06F 9/5088 |
| 2018/0295099 | A1* | 10/2018 | Kulper | H04L 61/2521 |

* cited by examiner

*Primary Examiner* — Kenneth Tang
(74) *Attorney, Agent, or Firm* — Fish & Richardson P.C.

(57) ABSTRACT

Exemplary methods, apparatuses, and systems perform a live migration of a virtual infrastructure from a first set of data stores to a second set of data stores using a placement engine configured to determine optimal locations for placement of components of the virtual infrastructure and an optimal order of migration for the components of the virtual infrastructure from the first set of data stores to the second set of data stores.

20 Claims, 3 Drawing Sheets

MIGRATION OF VIRTUAL INFRASTRUCTURES

FIELD OF THE INVENTION

The various embodiments described in this document relate to the management of virtual infrastructures. In particular, embodiments relate to determining efficient migration of virtual infrastructures from one set of data stores to another set of data stores.

BACKGROUND OF THE INVENTION

A virtual infrastructure is composed of virtual components stored on physical hardware and storage. Components of a virtual infrastructure can include virtual machines (VMs), VM snapshots, VM templates, managed media (e.g., floppy and CD resources), independent disks, data center tenancy rules and boundaries, and virtual networking devices, including edge gateways. Components of a virtual infrastructures may be migrated for various reasons, including a need to scale out data capacity and rebalance data stores across a new aggregation of storage, decommission data stores that have reached the end of service, and an upgrade or downgrade of a tenant's "tiers of storage" capabilities.

However, existing migration solutions have deficiencies. For example, in some migration solutions, management systems are unable to access all of the components of a virtual infrastructure, including routing appliance (e.g., edge gateways). In other migration solutions, a storage system can be migrated, but without the ability for management systems to identify or distinguish the entities, organizations, or tenants that may utilize or are associated with some or all of the storage system.

Also, in some migration solutions, access to the virtual infrastructure is paused or restricted while the migration process is performed. Because of the downtime and/or loss of productivity, these solutions can result in significant costs to tenants associated with the virtual infrastructure. For that reason, migration of a virtual infrastructure typically needs to incur as little downtime as possible.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that implement a method of performing a live migration of a virtual infrastructure from a first set of data stores to a second set of data stores. An infrastructure manager receives an input that identifies a virtual infrastructure for migration. For example, the virtual infrastructure may be tied to a specific tenant (e.g., organization, entity, etc.). The infrastructure manager identifies components of the virtual infrastructure to be migrated and determines whether the second set of data stores satisfies tenancy requirements associated with the virtual infrastructure. When the second set of data stores satisfies the tenancy requirements, the infrastructure manager uses a placement engine to determine locations in the second set of data stores for each of the components of the virtual infrastructure, and, optionally, determine an order of migration for the components of the virtual infrastructure. The infrastructure manager uses the determined locations (and optionally the order of migration) to perform live migration of the virtual infrastructure. As a result, the infrastructure manager facilitates migration of components of the virtual infrastructure, including networking components that may not be exposed to the tenant or managed like other components of the infrastructure (e.g., an edge gateway), while minimizing downtime of individual components.

Figure 1:
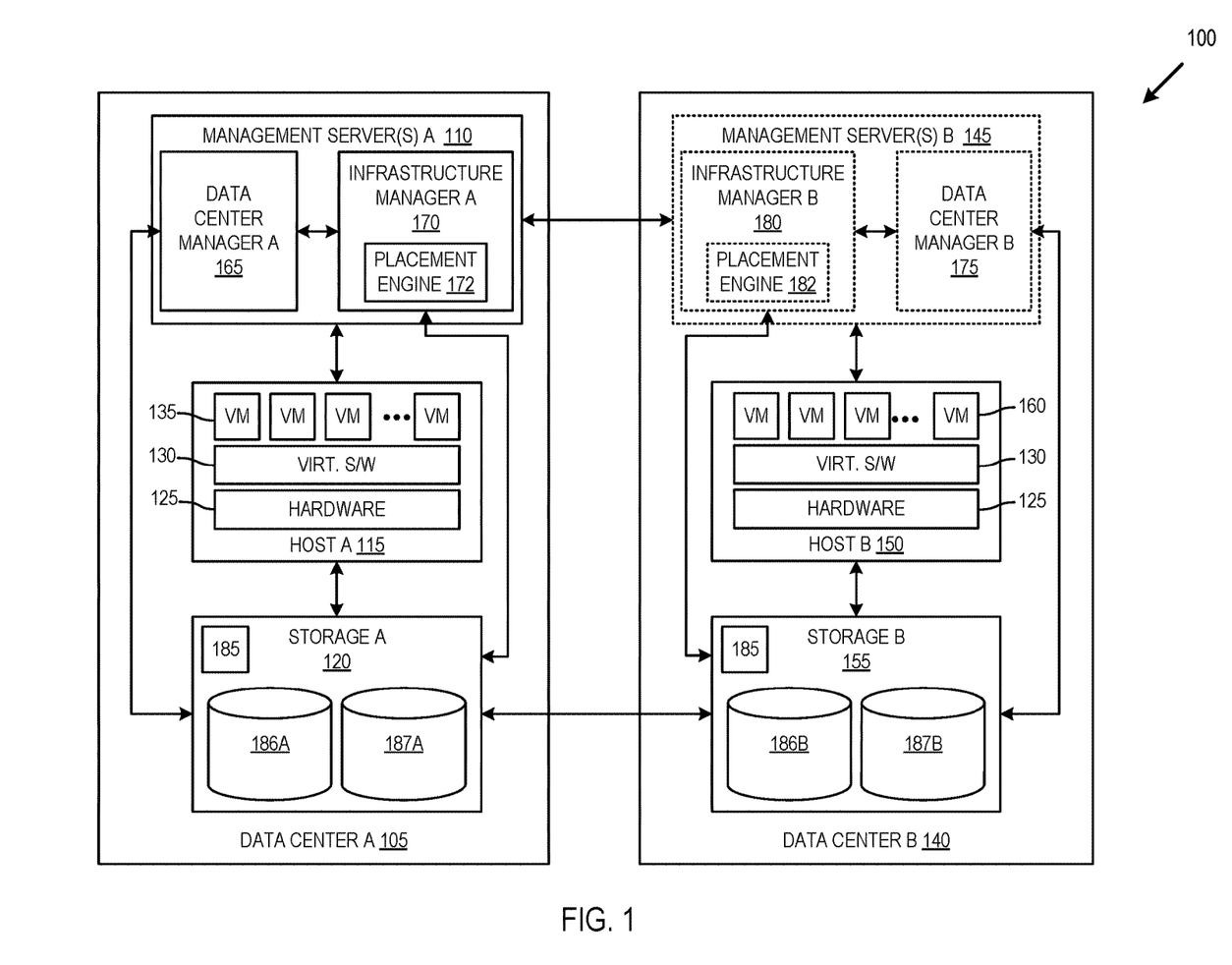
FIG. 1 illustrates, in block diagram form, an exemplary computing environment, containing data centers configured to optimize migration of virtual infrastructures.

FIG. 1 illustrates, in block diagram form, exemplary computing environment 100, containing virtual data centers configured to optimize migration of virtual infrastructures. This document may also refer to hosts 105 as nodes, computers, processing devices, and/or servers. Data center A 105 includes management server A 110, one or more host devices (e.g., host A 115), and storage A 120. Each host device 115 includes hardware 125, virtualization software layer 130 (also referred to as a hypervisor), and virtual machines (VMs) 135. Similarly, data center B 140 includes one or more host devices (e.g., host device B 150), and storage B 155. In one embodiment, data center B 140 optionally includes management server B 145. In other embodiments, management server A 110 manages both data center A 105 and data center B 140. Each host device 150 includes hardware 125, virtualization software layer 130, and VMs 160. In one embodiment, data center A 105 represents a first data center site and data center B 140 represents a second, geographically distinct data center site.

VMs 135/160 are complete computation environments, containing virtual equivalents of the hardware and system software components of a physical system and are typically implemented by an extensive virtualization infrastructure, which includes a variety of software and hardware components. For example, one or more of VMs 135/160 may implement virtual desktops. A virtual desktop is a virtual computing system that operates as a desktop or workstation computer with which an end user can interact using a desktop remoting protocol over a network. In one embodiment, one or more of VMs 135/160 implement a virtualized computer, networking, storage, or security service (e.g., a firewall, webserver, database server, etc.). For example, a VM 135 within data center A 105 may serve as an edge gateway for a tenant of data center A 105.

Virtualization software layer 130 runs on hardware 125 of host device 115/150 (e.g., a physical computer) and manages one or more of VMs 135/160. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk for each VM 135/160 within underlying storage 120/155.

Each of storage A 120 and storage B 155 includes one or more physical storage devices. Storage A 120 and storage B 155 may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic storage devices, optical storage devices, etc. The memory may be internal or distributed memory. In one embodiment, storage A 120 and storage B 155 are storage arrays and include storage controllers 185 to serve read and write requests and management commands/queries from host devices 115/150 and management servers 110/145. Each of storage A 120 and storage B 155 is partitioned into logical units, volumes, virtual volumes, and/or disks (which are collectively referred to herein as logical storage devices) that are stored on one or more of the physical storage devices. Each logical storage device is identified by a device identifier, e.g., a logical unit number (LUN), volume identifier, etc. For example, storage A 120 is illustrated as including logical storage devices 186A and 187A and storage B 155 is illustrated as including logical storage devices 186B and 187B. Each of storage A 120 and storage B 155 may include additional arrays, logical storage devices, or other partitions of storage.

Management server A 110 includes data center manager A 165. In one embodiment, data center manager A 165 provides a management console for manual and automated control of hosts 115, VMs 135, and storage A 120. In one embodiment, data center manager B 175 similarly provides a management console for manual and automated control of hosts 150, VMs 160, and storage B 155. For example, data center manager A 165 and data center manager B 175 provision, configure, and maintain VMs as virtual desktops or network services; manage pools of computer resources to run the VMs. In an alternative embodiment, data center manager A 165 provides a management console for manual and automated control of hosts 115/150, VMs 135/160, storage A 120, and storage B 155.

Management server A 110 further includes infrastructure manager A 170. Infrastructure manager A 170 is a management system that monitors and controls virtual infrastructure resources. In one embodiment, infrastructure manager A 170 is configured to create and manage a virtual infrastructure, including its components and resources. For example, infrastructure manager A 170 can create and manage a virtual infrastructure for a data center tenant, including allocating the compute, storage, and network resources required for the virtual infrastructure and in compliance with tenancy rules and boundaries. In one embodiment, infrastructure manager A 170 performs migration of virtual infrastructures from a first set of data stores to a second set of data stores (e.g., as described with reference to FIGS. 2-3).

Infrastructure manager A 170 includes placement engine 172. In one embodiment, placement engine 172 determines locations for migration of components of a virtual infrastructure. Placement engine 172 is configured to handle a plurality of object types simultaneously. For example, placement engine 172 is capable of concurrently migrating VMs, edge gateways, independent disks, media files, etc. In one embodiment, placement engine 172 also determines an order of migration for the components of the virtual infrastructure to be migrated. In one embodiment, management server B 145 similarly includes infrastructure manager B 180 and placement engine 182, configured to perform in the manner described with respect to infrastructure manager A 170 and placement engine 172.

Components of data center A 105 are coupled to components of data center B 140. While various components are illustrated as being directly coupled for the ease of explanation (e.g., to illustrate the direction of replicated data), a network including one or more switches or routers may lie between data center A 105 and data center B 140 and facilitate the coupling of the various components.

Figure 2:
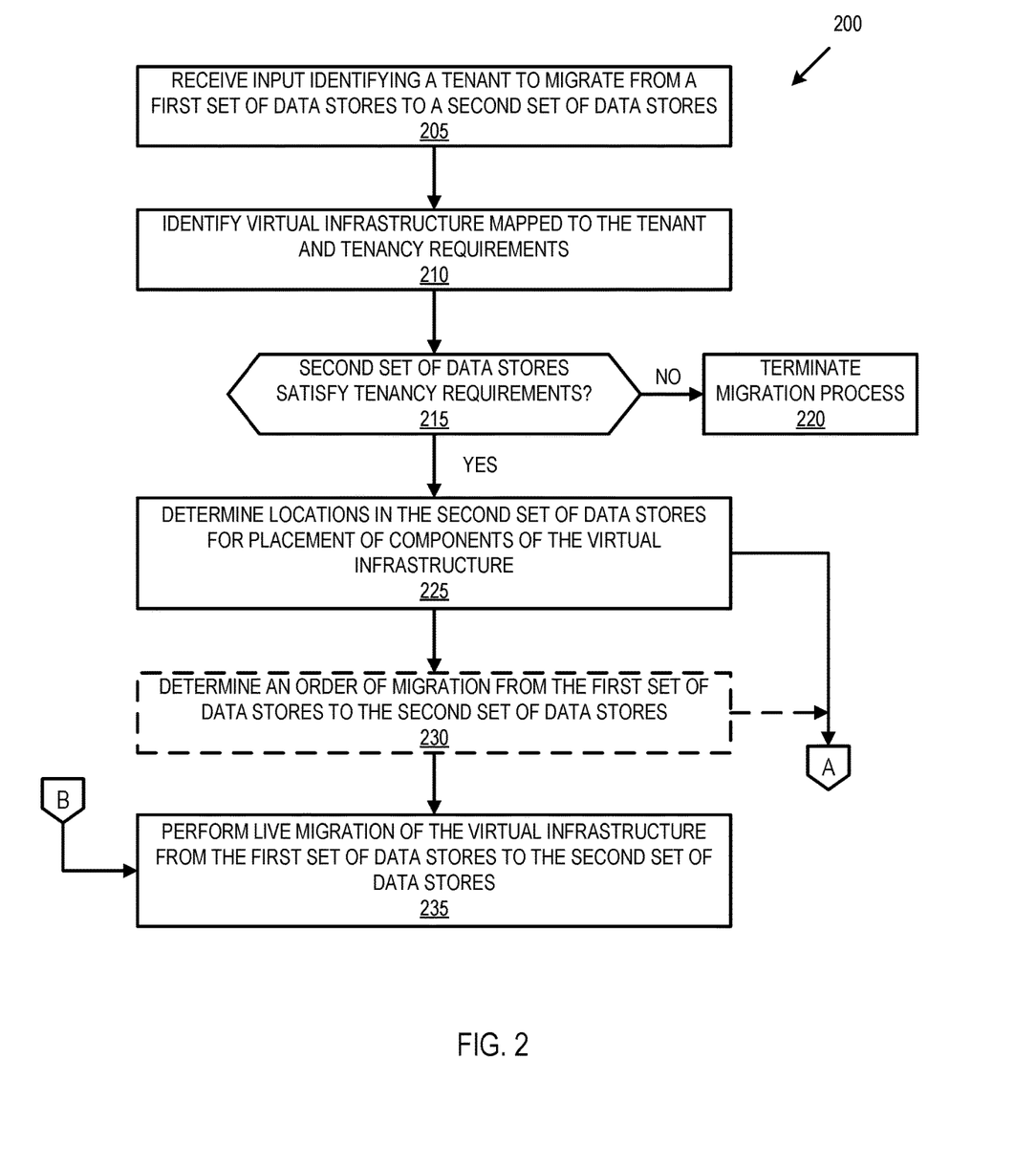
FIG. 2 is a flow chart illustrating an exemplary method of performing a migration of a virtual infrastructure.

FIG. 2 is a flow chart illustrating exemplary method 200 of performing a migration of a virtual infrastructure. Method 200 is described with reference to infrastructure manager A 170 handling the migration of a virtual infrastructure associated with a tenant from a first set of data stores to a second set of data stores. In the embodiment described with respect to method 200, the first set of data stores is in storage A 120 and the second set of data stores is in storage B 155. In other embodiments, the first set of data stores and the second set of data stores are in the same data center. For example, infrastructure manager A 170 migrates the virtual infrastructure from logical storage device 186A to logical storage device 187A in data center A 105. The embodiments described in method 200 can be similarly performed using infrastructure manager B 180.

At block 205, infrastructure manager A 170 receives an input identifying a tenant to migrate from a first set of data stores to a second set of data stores. For example, the input may directly identify a tenant to be the subject of infrastructure migration. The tenant can be one of multiple tenants of a virtual data center implemented within the first set of data stores. In one embodiment, each tenant is an individual entity or customer with an isolated virtual infrastructure, even where multiple tenants exist on a single piece of physical hardware. In one embodiment, each tenant is designated specific amounts of resources (e.g., CPU, storage, and networking). The amounts of resources can be defined by tenancy requirements. In other embodiments, infrastructure manager A 170 receives an input identifying a set of data stores for migration, instead of directly identifying a specific tenant. Infrastructure manager A 170 identifies one or more tenants dependent upon the data stores that are to be migrated. For example, tenancy polices may require migration of virtual infrastructure of the tenant in addition to that stored on the identified data stores, as opposed to migrating only the portion of tenant infrastructure stored on the identified data stores.

In some embodiments, the second set of data stores has different capabilities than the first set of data stores. For example, the second set of data stores can include different storage capabilities than the first set of data stores, e.g., lesser or greater storage, different types of storage, etc. The ability to migrate the tenant from the first set of data stores to a second set of data stores having different capabilities allows for the upgrading or downgrading of the tenant's storage-based capabilities.

At block 210, infrastructure manager A 170 identifies a virtual infrastructure mapped to the tenant and tenancy requirements associated with the tenant. In one embodiment, infrastructure manager A 170 identifies the virtual infrastructure mapped to the tenant using a tenant identifier. Infrastructure manager A 170 maps the tenant identifier to the components of the virtual infrastructure requested for migration. For example, the mapping consists of all the virtual infrastructure associated with the tenant (when the request is to migrate a specified tenant), or consists of all the virtual infrastructure that exists on the source data stores (when the request is to migrate specified data stores). The virtual infrastructure can include one or more of VMs, VM snapshots, VM templates, managed media (e.g., floppy and CD resources), independent disks, edge gateways, components of a virtual network fabric for the tenant, etc.

In one embodiment, infrastructure manager A 170 retrieves tenancy requirements from a profile associated with the tenant. In another embodiment, the input identifying the tenant to migrate includes parameters or tenancy requirements for the migration. The tenancy requirements can include one or more of affinity rules and anti-affinity rules for a virtual infrastructure mapped to the tenant, host preferences, and storage preferences. Affinity rules establish relationships between two or more components (e.g., VMs, hosts, etc.) of the virtual infrastructure. Affinity rules can indicate a preference or requirement that virtual components be kept together, while anti-affinity rules can indicate a preference or requirement that virtual components be kept separated. For example, an affinity rule may indicate a preference or requirement that components with a particular license be placed in a license group on a particular host. Host preferences and storage preferences can indicate preferences or requirements regarding the size, configuration, and/or capabilities of hosts and data stores. For example, the tenancy requirements may indicate a preference or requirement for a specific number of hosts for the virtual infrastructure or a minimum amount of storage.

At block 215, infrastructure manager A 170 determines whether the second set of data stores satisfy the tenancy requirements. Infrastructure manager A 170 determines whether the tenancy requirements are satisfied by comparing the available storage, configuration, and capabilities of the second set of data stores with the tenancy requirements. In one embodiment, the tenancy requirements specify minimum CPU, storage and/or networking requirements for the virtual infrastructure, as well as any affinity requirements towards compute (hosts), or other entities in the system (e VMs, disks, etc.). If infrastructure manager A 170 determines that the second set of data stores do not satisfy the tenancy requirements associated with the tenant, the flow proceeds to block 220. If infrastructure manager A 170 determines that the second set of data stores do satisfy the tenancy requirements associated with the tenant, the flow proceeds to block 225.

In embodiments where the second set of data stores have different capabilities from the first set of data stores, or the input indicates a modification to the tenancy requirements associated with the virtual infrastructure of the tenant, infrastructure manager A 170 can modify the storage profiles of components of the virtual infrastructure. Modifications to the storage profiles can include allocating a different amount of storage space allocated to the second set of data stores than was previously allocated to the first set of data stores. For example, when the second set of data stores includes larger storage capabilities, infrastructure manager A 170 can modify the storage profiles of the components of the virtual infrastructure to allow the components to utilize additional storage resources.

At block 220, in response to determining that the second set of data stores do not satisfy the tenancy requirements associated with the tenant, infrastructure manager A 170 terminates the migration process. In one embodiment, in response to terminating the migration process, infrastructure manager A 170 generates a report or log indicating the reasons for the termination of the migration process.

At block 225, infrastructure manager A 170 determines locations in the second set of data stores for placement of components of the virtual infrastructure. In one embodiment, infrastructure manager A 170 configures placement engine 172 to determine the locations in the second set of data stores for the migration. In one embodiment, placement engine 172 ensures that the resources on the destination data stores (e.g., the second data stores) are correctly reserved and not overprovisioned with respect to the actual physical limits of the destination data stores. In one embodiment, placement engine 172 ensures that the components of the virtual infrastructure are placed in data stores that are in compliance with the tenancy requirements for the tenants.

In one embodiment, infrastructure manager A 170 determines whether there are any components of the virtual infrastructure that cannot be moved from the first set of data stores to the second set of data stores. In such embodiments, when infrastructure manager A 170 determines that there is at least one component that cannot be moved, the migration can either proceed and an error message produced indicating the failure to move the component, or infrastructure manager A 170 terminates the migration process completely.

At block 230, infrastructure manager A 170 optionally determines an order of migration of the components of the virtual infrastructure from the first set of data stores to the second set of data stores. In one embodiment, the order of migration is determined, in part, based on prioritization rules. Where there are multiple tenants being migrated, components to be migrated may be grouped by tenant, and a first tenant is fully migrated from the first set of data stores to the second set of data stores prior to initiating the migration of the next tenant is initiated. With respect to the components within a single tenant's virtual infrastructure, components may be grouped by their relationship to each other and migrated together. For example, VMs that use the same gateway are migrated together. In one embodiment, prioritization is based on the following order of component categories: (1) gateways, (2) VMs, (3) disks, and (4) media, where ordering within each component category is based on size. In one embodiment, infrastructure manager A 170 orders the components within each component category by size, e.g., larger gateways are migrated prior to smaller gateways. In other embodiments, infrastructure manager A 170 migrates smaller components before larger components.

In one embodiment, infrastructure manager A 170 migrates an edge gateway associated with the virtual infrastructure prior to migrating components of the virtual infrastructure that rely on the edge gateway (e.g., applications). In another example, network infrastructure is moved with the VMs that depend upon it. In another example, infrastructure manager A 170 migrates media attached to a VM prior to migrating the VM. For example, infrastructure manager A 170 detaches the media from the VM, migrates the media and the VM, and then reattaches the migrated media to the migrated VM. Placement engine 172 provides a benefit to the migration process through its ability to handle the migration of multiple object types concurrently. For example, placement engine 172 can migrate components of the virtual infrastructure that affinity rules require be kept together, even if the components are of different object types. Further, the ability of placement engine 172 to handle concurrent migrations further allows the migration process to be completed in a shorter amount of time, reducing downtime.

Figure 3:
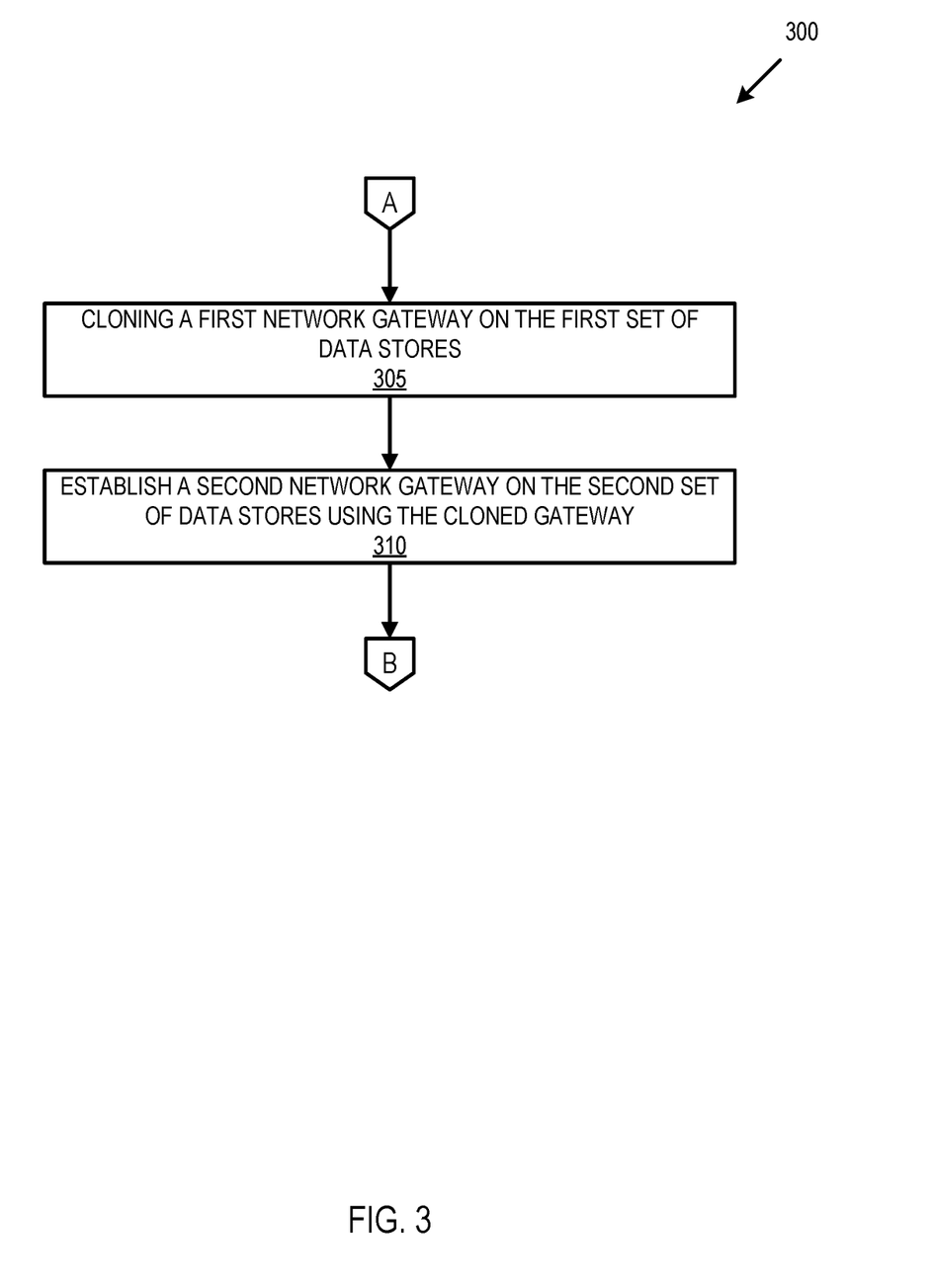
FIG. 3 is a flow chart illustrating an exemplary method of configuring an edge gateway for migration of data from a first set of data stores to a second set of data stores.

After placement engine 172 determines locations in the second set of data stores for placement of the components of the virtual infrastructure and/or after placement engine 172 optionally determines the order of migration of the components of the virtual infrastructure, infrastructure manager A 170 configures network components of the virtual infrastructure to facilitate the migration from the first set of data stores to the second set of data stores. In one embodiment, infrastructure manager A 170 clones a network gateway to facilitate the migration (e.g., by proceeding with method 300 at block 305 via off-page connector A).

At block 235, infrastructure manager A 170 performs a live migration of the virtual infrastructure from the first set of data stores to the second set of data stores. In embodiments where infrastructure manager A 170 determined the order of migration of the components of the virtual infrastructure from the first set of data stores to the second set of data stores, the live migration is performed using the determined order of migration. In one embodiment, infrastructure manager A 170 performs the live migrations while minimizing downtime for the virtual infrastructure. In a live migration, the components of the virtual infrastructure are moved from the first set of data stores to the second set of data stores while the components remain active in the first set of data stores. In one embodiment, infrastructure manager A 170 performs the live migrations by copying the components of the virtual infrastructure from the first set of data stores to the second set of data stores while the components are still running on the first set of data stores. In such embodiments, when all the components are copied to the second set of data stores or the virtual infrastructure on the source data stores is within a threshold of similarity with the virtual infrastructure on the destination data stores, infrastructure manager A 170 tracks changes made to the components subsequent their migration to the second set of data stores, and performs a final migration of any of the modified components. In one embodiment, infrastructure manager A 170 performs the live migrations with a fixed number of component migrations occurring concurrently. For example, infrastructure manager A 170 may migrate a bundle of one and eight components in parallel. The fixed number of migrations can be user-defined or based on a system-defined default. In other embodiments, infrastructure manager A 170 performs the live migrations with a dynamic number of migrations occurring concurrently, where infrastructure manager A 170 monitors the use of resources and can increase or decrease the number of concurrent migrations based on resource availability.

In one embodiment, infrastructure manager A 170 tracks the progress of the live migration and records the progress in a database table or other data structure. For example, infrastructure manager A 170 tracks the start and end times of each migration, the source location on the first set of data stores and the destination location on the second set of data stores for each component of the virtual infrastructure, metadata related to the components of the virtual infrastructure being migrated, etc. In one embodiment, infrastructure manager A 170 stores some or all of this data in a hash map.

In one embodiment, as infrastructure manager A 170 performs the live migration, infrastructure manager A 170 records any errors detected in the migration process. In such embodiments, when infrastructure manager A 170 detects a failure in the migration of a component of the virtual infrastructure, it records the failure, and proceeds to migrate the next component of the virtual infrastructure. For example, infrastructure manager A 170 reports the failure as a placement error. In one embodiment, when a first component has an affinity with a second component, and infrastructure manager A 170 is unable to migrate the first component, the migration of the first component is marked as a failure and infrastructure manager A 170 performs the migration of the second component. In one embodiment, infrastructure manager A 170 reports the failure to migrate the first component as a failure to comply with affinity rules. In another embodiment, if infrastructure manager A 170 determines that the first component cannot be migrated, infrastructure manager A 170 prevents the migration of the second component having an affinity with the first component.

Upon completion of the migration, infrastructure manager A 170 generates an audit log. In one embodiment, the audit log includes counts of the total migrated virtual infrastructure components found, successfully migrated virtual infrastructure components, unsuccessfully migrated virtual infrastructure components, and a count of virtual infrastructure components skipped due to the user canceling the in-progress migration or due to an error. In one embodiment, the audit log includes an error message indicating the reason why a particular virtual infrastructure component could not be migrated.

FIG. 3 is a flow chart illustrating an exemplary method 300 of configuring a network gateway for migration of data from a first set of data stores to a second set of data stores. In one embodiment, the network gateway routes data to an external network, and can provide services, including load balancing, network address translation, and a firewall. For example, the network gateway is a virtual network gateway that facilitates the transmission of data traffic between the components of the virtual infrastructure and an external network. In one embodiment, infrastructure manager A 170 configures the network gateway for the migration prior to migrating other components of the virtual infrastructure. At block 305, infrastructure manager A 170 clones a first network gateway located on the first set of data stores. Infrastructure manager A 170 clones the first network gateway by generating a copy of the first network gateway. Cloning the first network gateway creates a second network gateway with the same configuration and installed software as the first network gateway. For example, all aspects of the first network gateway that are tenant-visible are replicated on the second network gateway.

At block 310, infrastructure manager A 170 establishes the cloned network gateway as a second network gateway on the second set of data stores. In one embodiment, the second network gateway assumes the identity of the first network gateway. For example, infrastructure manager A 170 modifies a pointer pointing to the first network gateway to point to the second network gateway, such that data traffic directed to the first network gateway is automatically routed to the second network gateway. Configuring the second network gateway in this manner ensures that any modifications affecting components of the virtual infrastructure are applied to the migrated components on the second set of data stores as the live migration is being performed. In one embodiment, after the second network gateway assumes the identity of the first network gateway, infrastructure manager A 170 removes, or otherwise bypasses, the first network gateway. The method proceeds to block 235 of method 200 via off-page connector B.

In an alternative embodiment, infrastructure manager A 170 links the second network gateway to the first network gateway. In such embodiments, when the first network gateway receives data traffic directed to components of the virtual infrastructure, the first network gateway forwards the data traffic to the second network gateway. In such embodiments, infrastructure manager A 170 changes a pointer from the first network gateway to the second network gateway after migration is completed.

In an alternative embodiment, when the first set of data stores and the second set of data stores are located within the same cluster, infrastructure manager A 170 extends a network layer (e.g., an L2 layer) from the first set of data stores to the determined second set of data stores by configuring the second set of data stores to utilize a network gateway on the first set of data stores. For example, the migration may include moving infrastructure to a second set of data stores that did not have access to the same set of networks as the first set of data stores. In one embodiment, extending the network layer includes creating a network software infrastructure to provide the second set of data stores access to those networks to enable, e.g., a VM to operate in the destination host in the same manner as in the source host without reconfiguring the VM's networking. In such embodiments, extending the network layer from the first set of data stores to the determined second set of data stores provides network connectivity to the second set of data stores that minimizes any downtime associated with the migration.

It will be apparent from this description that aspects of the inventions may be embodied, at least in part, in software. That is, computer-implemented methods 200 and 300 may be carried out in a computer system or other data processing system in response to its processor executing sequences of instructions contained in a memory or another non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of data center A 105 and data center B 140, and, in some embodiments, fewer components than that shown in FIG. 1 may also be used in data center A 105 and data center B 140.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention (s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. operations, and/or that blocks with solid borders are not optional in some embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
receiving input identifying a tenant to migrate from a first set of data stores to a second set of data stores, wherein the tenant is one of multiple tenants of a virtual data center implemented within the first set of data stores;
in response to the input, identifying tenancy requirements and virtual infrastructure mapped to the tenant to be migrated;
determining the second set of data stores satisfy the tenancy requirements for the virtual infrastructure;
in response to determining the second set of data stores satisfies the tenancy requirements, determining locations in the second set of data stores for placement of components of the virtual infrastructure using the tenancy requirements; and performing a live migration of the virtual infrastructure from the first set of data stores to the determined locations in the second set of data stores, wherein performing the live migration of the virtual infrastructure from the first set of data stores to the determined locations in the second set of data stores comprises:
    establishing a second network gateway on the second set of data stores by cloning a first network gateway on the first set of data stores; and
    modifying a pointer pointing to the first network gateway to point to the second network gateway.

2. The method of claim 1, wherein the second set of data stores is configured for different capabilities from the first set of data stores, including a change in an amount of storage space allocated to the second set of data stores than allocated to the first set of data stores.

3. The method of claim 1, wherein the tenancy requirements include one or more of affinity rules and anti-affinity rules for the virtual infrastructure mapped to the tenant, host preferences, and storage preferences.

4. The method of claim 1, further comprising:
    determining an order of migration for the virtual infrastructure from the first set of data stores to the second set of data stores, wherein the live migration is performed based on the determined order of migration.

5. The method of claim 1, wherein the virtual infrastructure mapped to the tenant includes components of a virtual network fabric for the tenant.

6. The method of claim 1, wherein the pointer allows the second network gateway to assume the identity of the first network gateway, and, in response, the method further comprises removing the first network gateway.

7. The method of claim 1, wherein the second network gateway is configured for the migration prior to migrating other components of the virtual infrastructure.

8. A non-transitory computer-readable medium storing instructions, which when executed by a processing device, cause the processing device to perform a method comprising:
    receiving input identifying a tenant to migrate from a first set of data stores to a second set of data stores, wherein the tenant is one of multiple tenants of a virtual data center implemented within the first set of data stores;
    in response to the input, identifying tenancy requirements and virtual infrastructure mapped to the tenant to be migrated;
    determining the second set of data stores satisfy the tenancy requirements for the virtual infrastructure;
    in response to determining the second set of data stores satisfies the tenancy requirements, determining locations in the second set of data stores for placement of components of the virtual infrastructure using the tenancy requirements; and
    performing a live migration of the virtual infrastructure from the first set of data stores to the determined locations in the second set of data stores, wherein performing the live migration of the virtual infrastructure from the first set of data stores to the determined locations in the second set of data stores comprises:
        establishing a second network gateway on the second set of data stores by cloning a first network gateway on the first set of data stores; and
        modifying a pointer pointing to the first network gateway to point to the second network gateway.

9. The non-transitory computer-readable medium of claim 8, wherein the second set of data stores is configured for different capabilities from the first set of data stores, including a change in an amount of storage space allocated to the second set of data stores than allocated to the first set of data stores.

10. The non-transitory computer-readable medium of claim 8, wherein the tenancy requirements include one or more of affinity rules and anti-affinity rules for the virtual infrastructure mapped to the tenant, host preferences, and storage preferences.

11. The non-transitory computer-readable medium of claim 8, further comprising:
    determining an order of migration for the virtual infrastructure from the first set of data stores to the second set of data stores, wherein the live migration is performed based on the determined order of migration.

12. The non-transitory computer-readable medium of claim 8, wherein the virtual infrastructure mapped to the tenant includes components of a virtual network fabric for the tenant.

13. The non-transitory computer-readable medium of claim 8, wherein the pointer allows the second network gateway to assume the identity of the first network gateway, and, in response, removing the first network gateway.

14. The non-transitory computer-readable medium of claim 8, wherein the second network gateway is configured for the migration prior to migrating other components of the virtual infrastructure.

15. An apparatus comprising:
    a processing device; and
    a memory coupled to the processing device, the memory storing instructions which, when executed by the processing device, cause the apparatus to:
        receive input identifying a tenant to migrate from a first set of data stores to a second set of data stores, wherein the tenant is one of multiple tenants of a virtual data center implemented within the first set of data stores;
        in response to the input, identify tenancy requirements and virtual infrastructure mapped to the tenant to be migrated;
        determine the second set of data stores satisfy the tenancy requirements for the virtual infrastructure;
        in response to determining the second set of data stores satisfies the tenancy requirements, determine locations in the second set of data stores for placement of components of the virtual infrastructure using the tenancy requirements; and
    perform a live migration of the virtual infrastructure from the first set of data stores to the determined locations in the second set of data stores, wherein performing the live migration of the virtual infrastructure from the first set of data stores to the determined locations in the second set of data stores comprises:
        establishing a second network gateway on the second set of data stores by cloning a first network gateway on the first set of data stores; and
        modifying a pointer pointing to the first network gateway to point to the second network gateway.

16. The apparatus of claim 15, wherein the second set of data stores is configured for different capabilities from the first set of data stores, including a change in an amount of storage space allocated to the second set of data stores than allocated to the first set of data stores.

17. The apparatus of claim 15, wherein the tenancy requirements include one or more of affinity rules and anti-affinity rules for the virtual infrastructure mapped to the tenant, host preferences, and storage preferences.

18. The apparatus of claim 15, wherein the instructions further cause the apparatus to:
   Determine an order of migration for the virtual infrastructure from the first set of data stores to the second set of data stores, wherein the live migration is performed based on the determined order of migration.

19. The apparatus of claim 15, wherein the pointer allows the second network gateway to assume the identity of the first network gateway, and, in response, causing the apparatus to remove the first network gateway.

20. The apparatus of claim 15, wherein the second network gateway is configured for the migration prior to migrating other components of the virtual infrastructure.

* * * * *